United States Patent [19]

Kaster

[11] Patent Number: 4,589,320
[45] Date of Patent: May 20, 1986

[54] LOG LIFTING AND SUPPORT APPARATUS

[75] Inventor: Paul G. Kaster, Shelbyville, Ind.

[73] Assignee: Kasco Mfg. Co., Inc., Shelbyville, Ind.

[21] Appl. No.: 692,558

[22] Filed: Jan. 18, 1985

[51] Int. Cl.⁴ .............................................. B27B 15/02
[52] U.S. Cl. ...................................... 83/794; 83/730; 83/813
[58] Field of Search ................ 83/813, 794, 728, 730, 83/729

[56] References Cited

U.S. PATENT DOCUMENTS

| | | | |
|---|---|---|---|
| 547,433 | 10/1895 | Hazewinkel | 83/794 X |
| 739,044 | 9/1903 | Wilkin et al. | 83/813 X |
| 4,307,641 | 12/1981 | Shapleigh | 83/813 X |
| 4,334,669 | 6/1982 | Ross | 83/794 X |

Primary Examiner—Frank T. Yost
Attorney, Agent, or Firm—Barnes & Thornburg

[57] ABSTRACT

An improved height adjustable log support is provided for use in a portable sawmill having a horizontally extending blade run and a means for mounting the blade for longitudinal movement along and above the log. The log support includes a log receiving platform supported for vertical movement, lifting means and a cable connecting the platform to the lifting means. The lifting means includes a bar mounted for rotational movement, a bar driving means, such as a crank arm, and a ratchet and pawl for indexing incremental steps of rotational movement of the bar. The log bearing platform is raised incrementally as the cable connected therewith is wound onto the incrementally rotated bar.

16 Claims, 3 Drawing Figures

LOG LIFTING AND SUPPORT APPARATUS

BACKGROUND OF THE INVENTION

This invention relates to an improved apparatus for raising logs in uniform incremental amounts into the path of a bandsaw blade having a horizontally extending run. The present mechanism enables safer and more efficient sawmill use by facilitating the log handling task associated with sawmill operation.

Several types of portable sawmills are available for cutting lumber from trimmed logs. U.S. Pat. Nos. 3,213,906 and 3,721,146 each disclose sawmills having a bandsaw horizontally mounted in a carriage assembly designed to cut planks from the top of a log. In each of the described sawmills the bandsaw blade not only has longitudinal mobility so that it can be moved down the length of the log during each cut, but it also has vertical mobility so that the blade height can be adjusted relative to the position of the log. Thus after each plank is cut from the top of the log, the blade is lowered by an amount equal to the thickness of the next plank to be cut.

U.S. Pat. No. 4,275,632 discloses a similar portable sawmill having a bandsaw blade with a horizontally extending run mounted on a carriage which straddles the log to be cut. The portable sawmill disclosed in U.S. Pat. No. 4,275,632 differs, however, from the portable sawmills disclosed in the above-cited patents in that the carriage assembly for the bandsaw blade is itself not height adjustable. Instead the log is mounted on a pair of height adjustable log supports. At the end of each cutting stroke the log itself is raised by an amount approximating the thickness of the next plank to be cut from the top of the log. The log supports have height adjustable shelves. The height of the log is adjusted after each cut by using a jacking mechanism to lift each log end so that the height adjustable shelf on the log support at that end can be mounted at a higher position. The jacking mechanism is itself claimed in U.S. Pat. No. 4,334,669. The disclosed jacking mechanism is awkward to use and leaves much to be desired from the point of user safety.

Accordingly, it is an object of this invention to provide a safe and convenient means for raising a log in incremental amounts to be engaged by a horizontally extending bandsaw blade run to cut planks from the top of the log.

It is a further object of the present invention to provide an improved height adjustable log support for use in a bandsaw-type sawmill. These and other objects will be readily apparent from the following description of the invention.

SUMMARY OF THE INVENTION

The present invention is directed to a means for raising a log in substantially uniform incremental amounts and to an improved height adjustable log support incorporating such raising means. The invention finds particular application in the construction and operation of a portable sawmill of the type disclosed in U.S. Pat. No. 4,275,632, the disclosure of which is incorporated herein by reference. The sawmill has a horizontally extending blade run and a means for mounting the blade for longitudinal movement along and above the log. After each longitudinal cut of the horizontally extending blade run, the log is raised so that it can be engaged by the blade run to cut the next plank from the top of the log.

The present raising means includes at each end of the log a platform upon which the log rests, means for supporting the platform for vertical movement and a means for lifting the platform. The lifting means includes rotary means, rotary driving means, ratchet and pawl means for indexing incremental steps of rotational movement of the rotary means, and means for connecting the rotary means to the platform so that the platform is lifted in steps as the rotary means is rotated in steps.

The platform is supported for vertical movement by a support panel having a log proximal side and a log distal side and at least two vertically extending slots sized to receive support struts forming part of the platform.

The platform is constructed to minimize "binding"-'during log lifting operation. It includes a log receiving surface, surfaces for engaging both the log proximal and log distal sides of the support panel and at least two platform support struts laterally spaced for alignment with and extending through the platform strut receiving slots in the support panel. Because the weight of a log resting on the log receiving surface results in significant frictional contacts between the platform and the support panel it is preferred that at least one of the support panel engaging surfaces on the platform is provided with a friction reducing means such as a roller or caster.

In a preferred embodiment of this invention the means for connecting the rotary means and the platform is a cable which is threaded through holes in the rotary means so that the platform can be leveled as each new log is loaded onto the log supports.

DETAILED DESCRIPTION OF THE PREFERRED EMBODIMENTS

Figure 1:
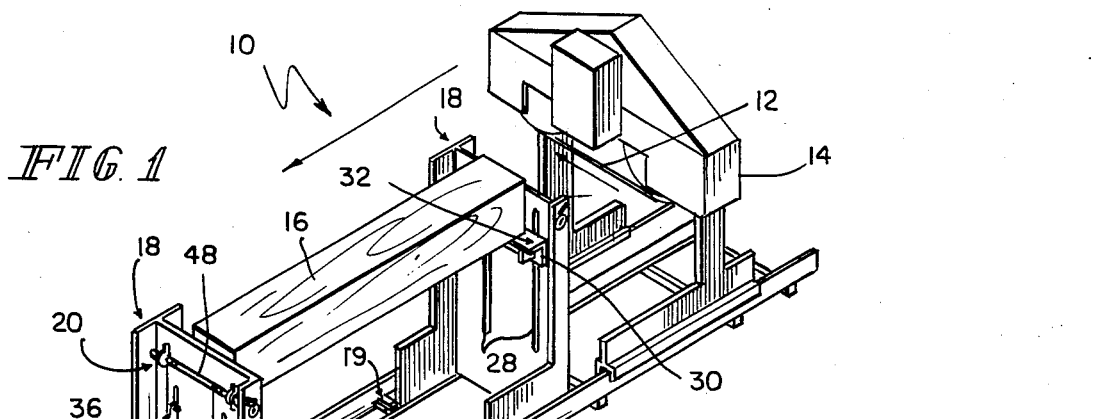
FIG. 1 is a perspective view of a portable sawmill utilizing improved adjustable log supports of the present invention.
Figure 2:
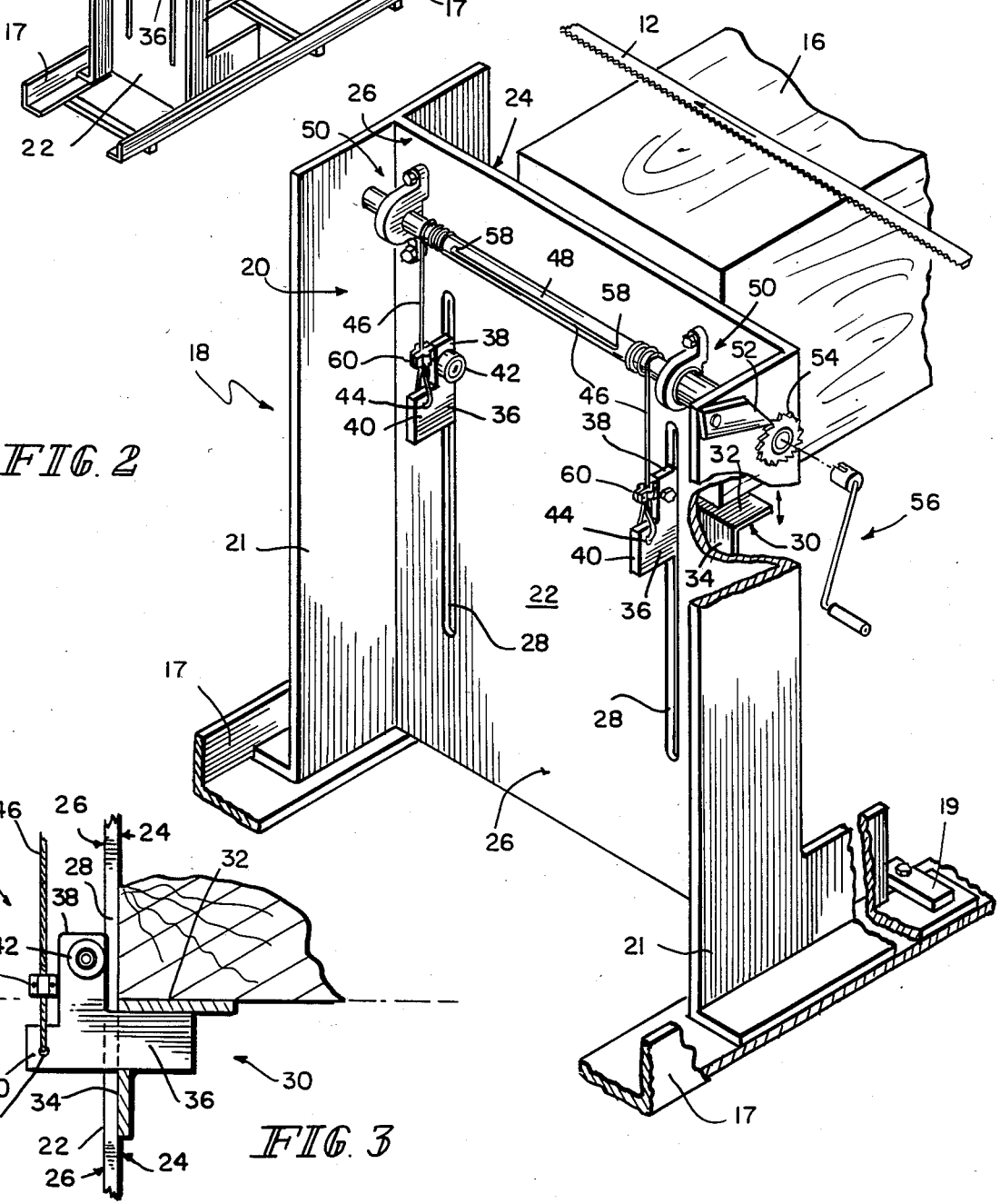
FIG. 2 is a perspective and partially broken away view of one of the log supports of the sawmill shown in FIG. 1.
Figure 3:
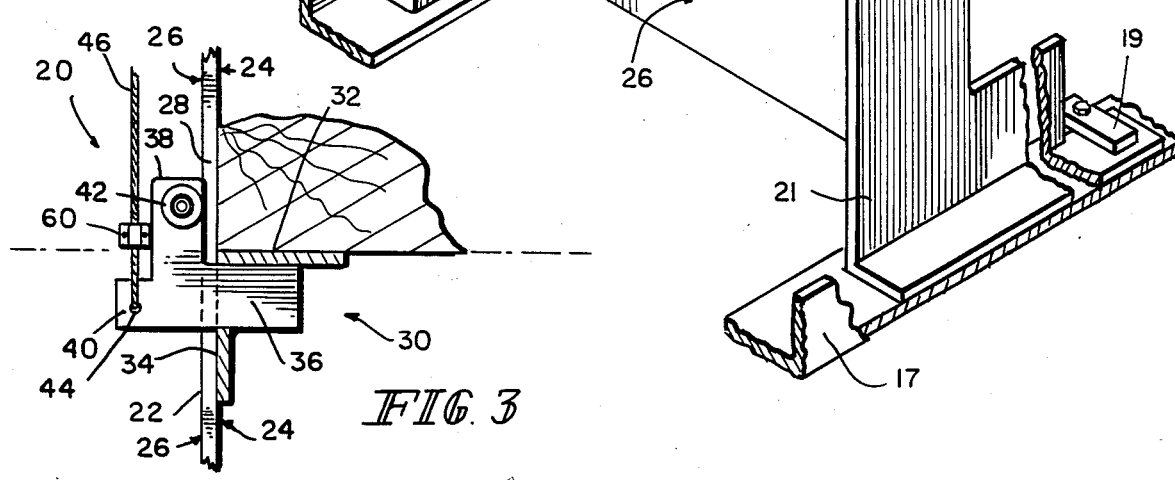
FIG. 3 is a transverse sectional view of the platform in position on the height adjustable log support shown in FIG. 2.

FIG. 1 depicts a portable sawmill 10 having a bandsaw blade 12 with a horizontally extending run mounted on carriage 14 for longitudinal movement along and above log 16. Log 16 is supported at each end by height adjustable log supports 18 which are movable longitudinally along rails 17 to accept logs of varying length. Each log support 18 can be locked in position on rails 17 using rail clamp 19.

Following each cut of blade 12 across the top of log 16 the carriage 14 is returned longitudinally to its pre-cutting position and the log 16 is raised in incremental amounts to be engaged on the next cutting stroke by bandsaw blade 12 using lifting means 20 forming part of each log support 18.

Log support 18 has a support panel 22 having a log proximal side 24 and a log distal side 26 and two vertically extending platform strut receiving slots 28. Log support 18 preferably is of steel construction and is formed to have perpendicular end walls 21 for added structural support. Each end of log 16 rests on a platform 30 which also forms part of each log support 18.

Platform 30 has a log receiving surface 32 and a surface 34 for engaging the log proximal side 24 of support panel 22. Platform 30 further has two platform support struts 36 which are aligned with and extend through platform strut receiving slots 28 in support panel 22. The platform support struts extend vertically to have upper and lower portions 38, 40 extending above and below, respectively, the plane of the log receiving surface 32 of platform 30. A roller 42 is positioned on the upper portion 38 of support strut 36 to engage with the log distal side 26 of support panel 22 adjacent to the vertical platform strut receiving slots 28. The contact of the surface of roller 42 with log distal side 26 of support panel 22 functions to hold support panel engaging surface 34 of platform 30 in a position closely spaced and substantially parallel to the log proximal side 24 of support panel 22. The lower portion 40 of each platform support strut is formed to extend longitudinally beyond upper portion 38 and is further formed to have an aperture 44 for receiving cable 46 which is connected to lifting means 20.

Lifting means 20 includes a bar 48 mounted for rotational movement by mountings 50 near the top of the log distal side 26 of support panel 22. A pawl 52 is mounted on end wall 21 to cooperate with ratchet 54 secured on bar 48 to index incremental steps of clockwise rotational movement of bar 48.

Bar 48 is provided with two cable receiving holes 58. The positioning of holes 58 on bar 48 is important for optimum operation of the present log support. Holes 58 are positioned so that the cable lengths supporting each end of platform 30 are wound on bar 48 at the same rate (lengh/rotation) and without cable overlap. This is accomplished by positioning holes 58 (1) so that the distance between them is less than the distance between the platform support struts 36 and (2) so that the point on bar 48 equidistant from holes 58 coincides with the point on the bar equidistant from the points on the bar in vertical alignment with platform support struts 36.

Cable 46 is threaded through holes 58 in bar 48, and the cable ends are secured using clamps 60 through aperture 44 on the lower portion 40 of platform struts 36. When platform 30 is moved to its lowest position, that is, where cable 46 is not wound on bar 48, the platform can be readily leveled, if necessary, by sliding cable 46 through holes 58 in bar 48.

Bar 48 is rotated manually using crank arm 56 which is reversibly engageable with the end of bar 48. By clockwise rotation of bar 48 in incremental steps defined by ratchet 54 and pawl 52 platform 30 is raised in corresponding incremental steps. Platform 30 can be lowered by disengaging pawl 52 and ratchet 54 and rotating bar 48 counterclockwise, thereby unwinding cable 46 from bar 48.

Although the invention has been described in detail with reference to the preferred embodiment illustrated in the drawings, variations and modifications exist within the scope and spirit of the invention as described and defined in the following claims.

I claim:

1. In a bandsaw-type sawmill for slicing planks from a log and including a bandsaw blade with a horizontally extending run and means for mounting the blade for longitudinal movement along and above a log, means for raising the log in incremental amounts to be engaged by the blade run to cut planks from the top of the log, said log raising means including, at each end of the log, a platform upon which the log rests, means for supporting the platform for vertical movement comprising a support panel having a log proximal and a log distal side, said platform having a log receiving surface and surfaces for engaging both the log proximal and log distal sides of the support panel, and means for lifting the platform, the lifting means including, rotary means, rotary driving means, ratchet and pawl means for indexing incremental steps of rotational movement of the rotary means, and means for connecting the rotary means to the platform so that the platform is lifted in steps when the rotary means is rotated in steps.

2. In a bandsaw-type sawmill for slicing planks from a log and including a bandsaw blade with a horizontally extending run and means for mounting the blade for longitudinal movement along and above a log, means for raising the log in incremental amounts to be engaged by the blade run to cut planks from the top of the log, said log raising means including, at each end of the log, a platform upon which the log rests, means for supporting the platform for vertical movement, and means for lifting the platform, the lifting means including rotary means, rotary driving means, ratchet and pawl means for indexing incremental steps of rotational movement of the rotary means, and means for connecting the rotary means to the platform so that the platform is lifted in steps when the rotary means is rotated in steps, said means for supporting the platform for vertical movement including a support panel having a log proximal side and a log distal side and at least two vertically extending platform strut receiving slots, and wherein the platform includes
   a log receiving surface,
   surfaces for engaging both the log proximal and log distal sides of the support panel and
   at least two platform support struts laterally spaced for alignment with and extending through the platform strut receiving slots in the support panel.

3. The raising means of claim 2 wherein the rotary means is a bar supported for rotational movement near the top of the log distal side of the support panel, and wherein the means for connecting the rotary means to the platform comprises a cable affixed to the platform support struts extending through the support panel slots so that the platform is raised and lowered as the cable is wound and unwound, respectively, on the bar by rotational movement of the bar.

4. The raising means of claim 3 wherein the platform support struts extending through the vertical slots in the support panel extend vertically to have portions above and below the plane of the log receiving surface of the platform, and wherein the means for engaging the log distal side of the support panel is positioned on the portion of the platform support struts above the plane of the log receiving surface and in a closely spaced relationship with the log distal side of the support panel whereby the surface of the platform for engaging the log proximal side of the support panel is held in a closely spaced relationship to the support panel.

5. The raising means of claim 4 wherein the means for engaging the log distal side of the support panel comprises a roller.

6. The raising means of claim 4 wherein the bar has two cable receiving holes positioned so that the distance between the holes is less than the distance between the platform support struts and so that the point on the bar equidistant from the holes coincides with the point on the bar equidistant from the points on the bar in vertical alignment with the platform support struts.

7. The raising means of claim 6 wherein the bar is connected to the platform support struts with a single cable which is threaded through the cable receiving holes and attached at each end to the platform support struts at a point below the plane of the log receiving surface.

8. The raising means of claim 7 wherein the rotary driving means is a crank arm.

9. In a bandsaw-type portable sawmill for slicing planks from a log and including a bandsaw blade with a horizontally extending run, means for mounting the blade for longitudinal movement along and above the log, and height adjustable means for supporting each end of the log so that the log can be engaged with the blade run, an improved height adjustable log support means including a platform upon which the log end rests, means for supporting the platform for vertical movement including a support panel having a log proximal and log distal side, said platform having a log receiving surface and surfaces for engaging both the log proximal and log distal sides of the support panel and means for lifting the platform, said lifting means including rotary means, means for driving said rotary means with mechanical advantage, ratchet and pawl means for indexing incremental steps of rotational movement of the rotary means and means for connecting the rotary means to the platform so that the platform is lifted in steps when the rotary means is advanced in steps.

10. In a bandsaw-type portable sawmill for slicing planks from a log and including a bandsaw blade with a horizontally extending run, means for mounting the blade for longitudinal movement along and above the log, and height adjustable means for supporting each end of the log so that the log can be engaged with the blade run, an improved height adjustable log support means including a platform upon which the log rests, means for supporting the platform for vertical movement including a support panel having a log proximal side and a log distal side and at least two vertically extending platform strut receiving slots, and means for lifting the platform, said lifting means including rotary means, means for driving said rotary means with mechanical advantage, ratchet and pawl means for indexing incremental steps of rotational movement of the rotary means and means for connecting the rotary means to the platform so that the platform is lifted in steps when the rotary means is advanced in steps, and wherein the platform includes a log receiving surface, surfaces for engaging both the log proximal and log distal sides of the support panel and at least two platform support struts laterally spaced for alignment with and extending though the platform strut receiving slots in the support panel.

11. The improved height adjustable log support of claim 10 wherein the rotary means is a bar supported for rotational movement near the top of the log distal side of the support panel, and wherein the means for connecting the rotary means to the platform comprises a cable affixed to the bar and to the platform support struts extending through the support panel slots so that the platform is raised and lowered as the cable is wound and unwound, respectively, on the bar by rotational movement of the bar.

12. The improved height adjustable log support of claim 11 wherein the platform support struts extending through the vertical slots in the support panel extend vertically to have portions above and below the plane of the log receiving surface, and wherein the means of engaging the log distal side of the support panel is positioned on the portion of the platform support struts above the plane of the log receiving surface and in a closely spaced relationship with the log distal side of the support panel whereby the surface of the platform for engaging the log proximal side of the support panel is held in a closely spaced relationship to the support panel.

13. The improved height adjustable log support of claim 12 wherein the means for engaging the log distal side of the support panel is a roller.

14. The raising means of claim 12 wherein the bar has two cable receiving holes positioned so that the distance between the holes is less than the distance between the platform support struts and so that the point on the bar equidistant from the holes coincides with the point on the bar equidistant from the points on the bar in vertical alignment with the platform support struts.

15. The raising means of claim 14 wherein the bar is connected to the platform support struts with a single cable which is threaded through the cable receiving holes and attached at each end to the platform support struts at a point below the plane of the log receiving surface.

16. The improved height adjustable log support of claim 15 wherein the rotary driving means is a crank arm.

* * * * *